United States Patent [19]

Meyers et al.

[11] Patent Number: 5,480,261

[45] Date of Patent: Jan. 2, 1996

[54] HEAT RESISTANT CONTAMINATION CONTROL BOOM

[75] Inventors: Frank Meyers; John A. Brown, both of Redondo Beach; Robert Reidel, Hawthorne, all of Calif.

[73] Assignee: Kepner Plastics Fabricators, Inc., Torrance, Calif.

[21] Appl. No.: 223,278

[22] Filed: Apr. 4, 1994

[51] Int. Cl.$^6$ .................................................. E02B 15/04
[52] U.S. Cl. .................................................. 405/63; 405/66
[58] Field of Search ............................... 405/60, 63, 64, 405/66, 70, 71, 72; 210/242.1, 242.2, 242.3, 242.4

[56] References Cited

U.S. PATENT DOCUMENTS

| | | |
|---|---|---|
| 3,798,911 | 3/1974 | Oberg . |
| 3,811,285 | 5/1974 | Ballu . |
| 4,068,478 | 1/1978 | Meyers et al. . |
| 4,295,755 | 10/1981 | Meyers ................................. 405/66 |
| 4,507,017 | 3/1985 | Magoon ................................. 405/66 |
| 4,537,528 | 8/1985 | Simpson ................................. 405/72 |
| 4,752,393 | 6/1988 | Meyers ................................. 405/63 X |
| 4,923,332 | 5/1990 | Sanocki et al. ........................... 405/63 |

OTHER PUBLICATIONS

3m Fire Boom: An Integral Tool For Responsible Oil Spill Management by Minnesota Mining and Manufacturing Company.

*Primary Examiner*—Dennis L. Taylor
*Assistant Examiner*—Frederick L. Lagman
*Attorney, Agent, or Firm*—Fulwider Patton Lee & Utecht

[57] ABSTRACT

An improved heat-resistant surface contaminant containment boom is described, which has a floatation section incorporating refractory materials and spacing materials providing an air-gap around an inner float assembly which can be formed of less heat-resistant and more flexible materials. Further, the boom provides a water wicking action which draws water into the boom to be converted to steam. Provision is made for the steam to escape from the boom removing heat therefrom allowing the float assembly within to remain at a cooler temperature.

23 Claims, 5 Drawing Sheets

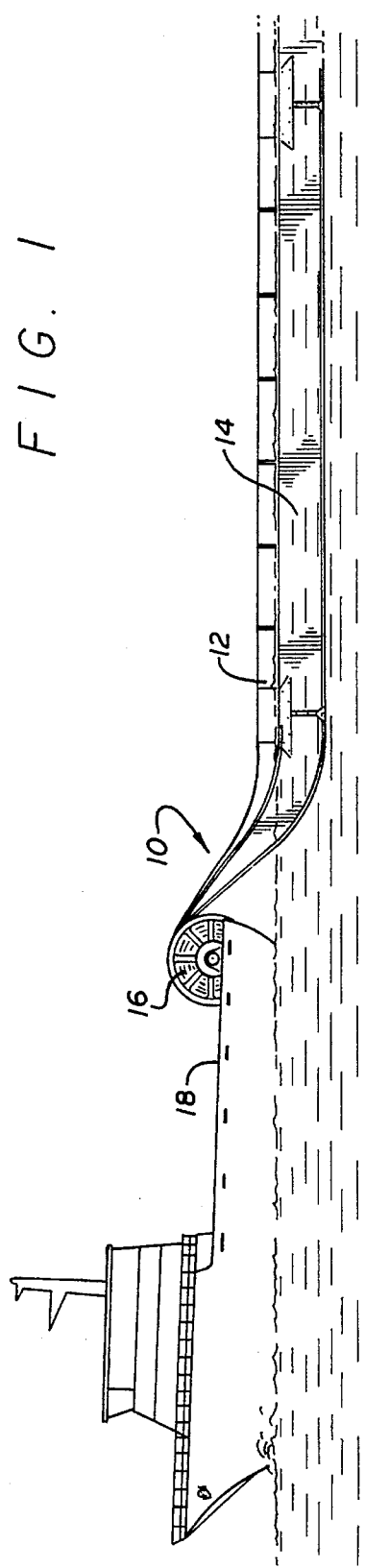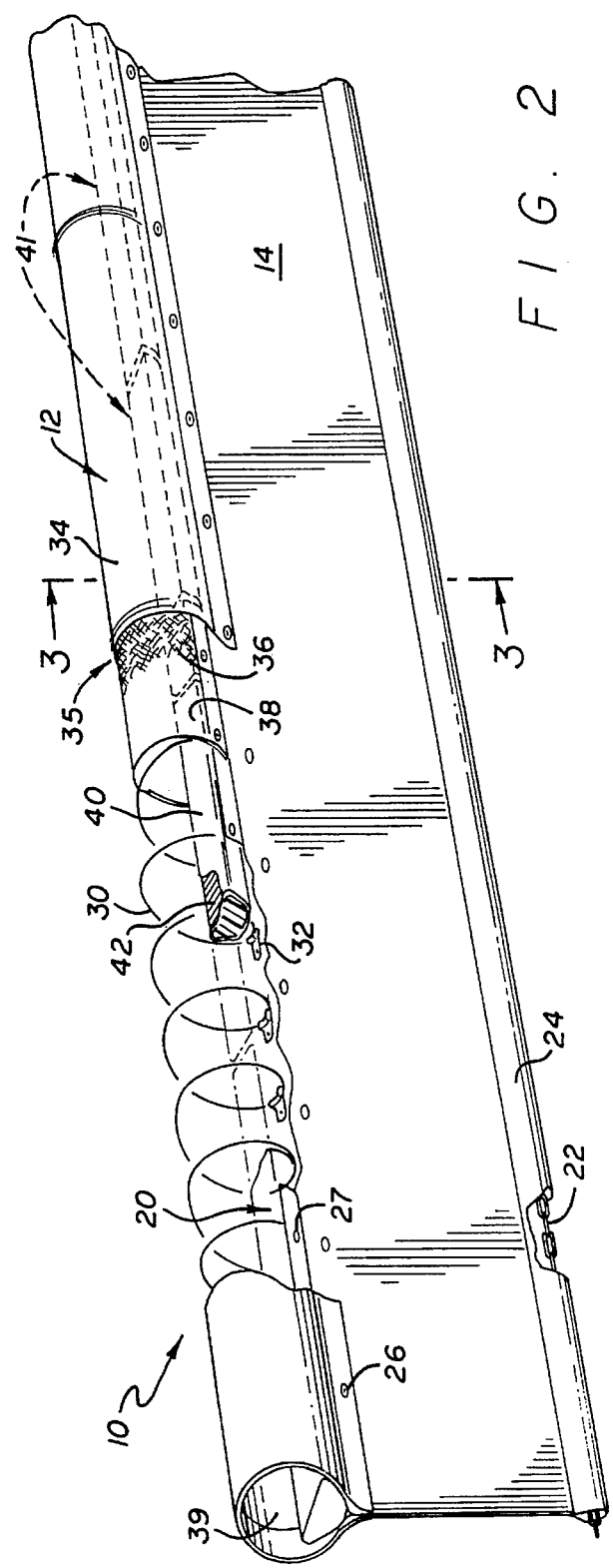

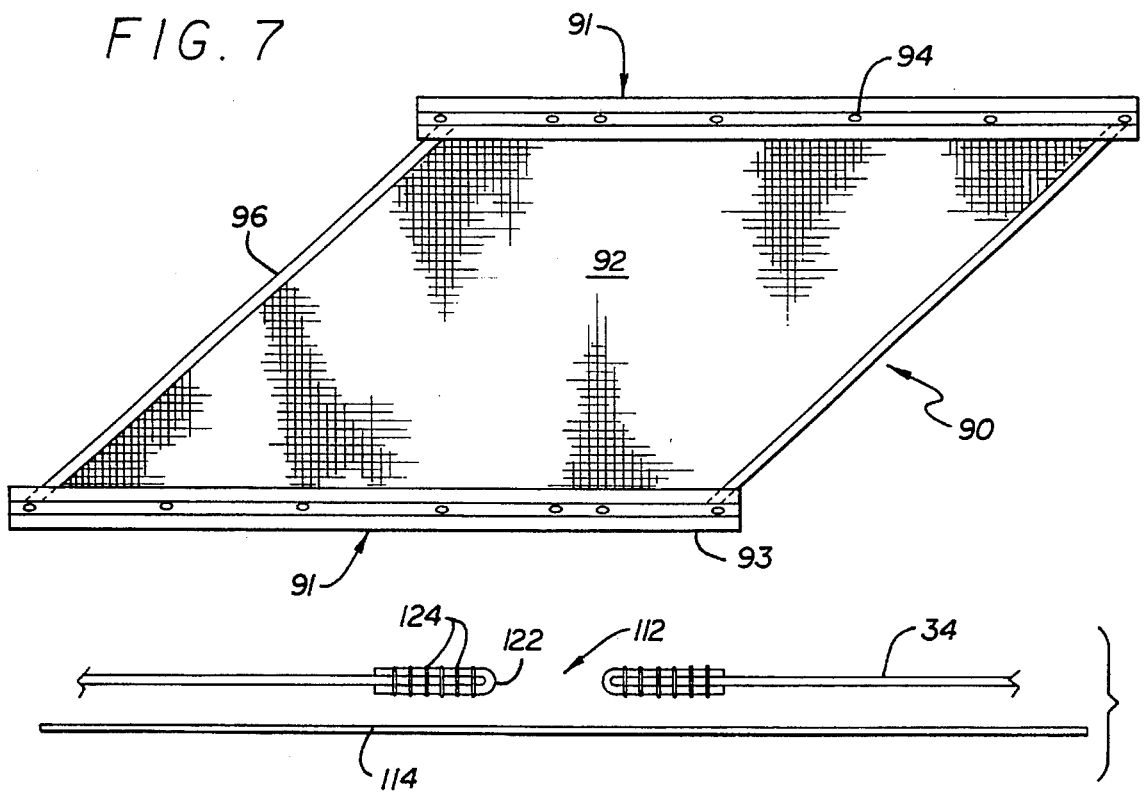
FIG. 7
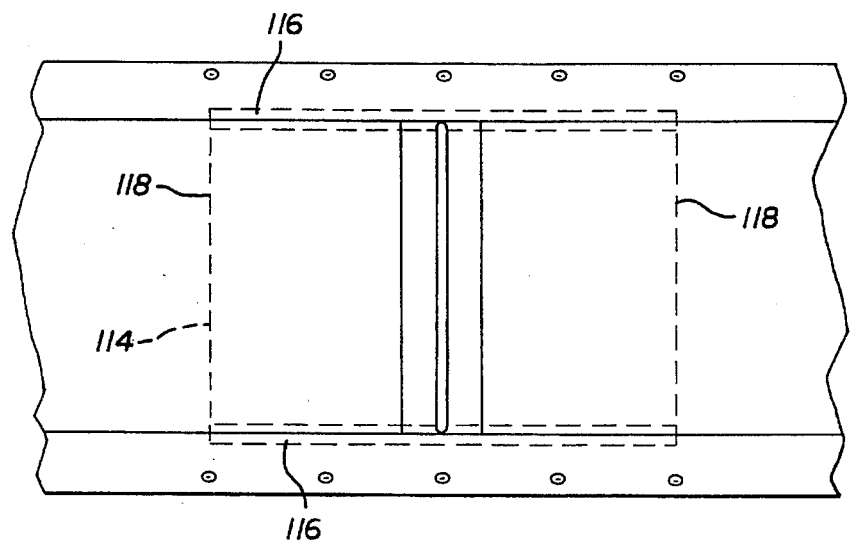
FIG. 8
FIG. 9

HEAT RESISTANT CONTAMINATION CONTROL BOOM

BACKGROUND OF THE INVENTION

1. Field of the Invention

This invention relates generally to a flotation barrier or boom, and, more particularly, to an improved contamination control boom of the type which is collapsible for more compact storage, and which has improved heat resistance properties, making the boom able to contain a burning surface contaminant for long periods.

2. Description of Related Art

The increasing frequency of contamination of bodies of water such as harbors, rivers, lakes, oceans, and the like, by spills of contaminants, e.g. petroleum, petroleum products, or other chemicals, has increased the need for effective contaminant containment and disposal equipment. Particularly, containment barriers or booms are utilized to separate the area of a body of water having a contaminant on the surface thereof from adjacent areas of the body of water. Typically such booms comprise a flotation portion to provide buoyancy, which rises above the surface of the water, and a weighted curtain or skirt portion which extends down into the water to a distance effective to prevent contaminants from escaping underneath the flotation portion of the boom.

Because such booms are necessarily relatively long, and are desirably stored so as to be quickly deployable in the area of a contaminant spill, it is advantageous to provide a boom which is collapsible, so that a smaller volume of space is required for storage, and so that it is more easily transported. However, the boom should be capable of quickly being put in service, and it has been found that storing such a containment boom in a collapsed condition wound on a reel or drum, and having the ability to spring quickly to its intended shape when free of the storage reel, satisfies these conditions. In order to do so, the boom should be made flexible for storage, and yet, the boom structure must be adequately stiff and damage resistant to function properly when deployed.

A further desired attribute is that the boom be fire resistant. It is often the case that a flammable contaminant is to be contained, or that such a contaminant is purposely burned when contained. For example, in-situ burning of spilled petroleum is recognized as a desirable clean-up response, as the harmful effects of the emissions of the products of combustion are thought to be much less damaging to the environment than the effects of spilled oil contaminating shoreline, sea floor, and wildlife.

Consequently, the boom must be constructed so as to be able to perform its containment function while withstanding the high temperatures associated with burning of contaminants for extended periods, which may last several days. Certain woven ceramic fiber materials have a sufficiently refractory nature that their physical properties will remain unchanged under such conditions, and are sufficiently flexible to form an outer skin of the boom. However, such materials may be somewhat porous, or may be punctured, and thus not be suited to containing air to provide flotation.

It has been recognized by those concerned with the art that a separate float, which is capable of maintaining the buoyancy of the boom independently of the porosity of the outer layer or layers of the material from which the boom is constructed, is a solution to this problem. Conventionally, this is done by placing float material, such as a closed-cell foam material, within the float portion of the boom.

Conventional float materials such as closed-cell foams may be relatively stiff, and therefore unsuited to the bending inherent in compact storage, deployment and use of a boom of this type. Further, conventional closed-cell foams otherwise suitable for this application will break down at temperatures to which they may be required to be exposed for long periods in a containment boom application for burning surface contaminants. Some present devices employ a flotation material having refractory properties. However, such relatively refractory materials tend to be more stiff in comparison to conventional float materials such as foams formed from polymeric resins having otherwise similar closed-cell characteristics. Consequently, booms using such refractory flotation materials are relatively heavy and more difficult to store compactly, as the flotation portions of such booms do not deform as readily.

Another consideration in the design of booms is that they must be constructed so as to remain functional in adverse conditions such as rough water surface conditions or a very rapid deployment in an emergency. Again, flexibility and light weight are important factors in allowing the boom to function as required. Yet high strength requirements of materials employed conventionally also implies a stiffer overall construction, and hence presents a dilemma to those concerned with providing a serviceable boom construction which is compactly storable.

Similarly, it has been recognized that providing a flexible float within the boom is desirable, yet conflicts with the requirement that the boom be capable of functioning in the very high temperatures that may be associated with containing a burning surface contaminant over a long period of time. Conventional float materials must be somehow shielded from heat that may damage them, implying further structure adding bulk and/or stiffness, or the use of refractory float materials requiring less protection that are themselves more stiff.

In light of the forgoing, it has been recognized that the desirable attributes of a contaminant containment boom of this type should include suitable containment capability even when exposed to the intense heat of burning contaminants such as spilled crude oil, for example. Also desirable are flexibility and durability for ease of deployment and use, even for long periods, and collapsibility and flexibility for more convenient storage and transport. Convenience of storage and transport allows the boom to be more accessibly located in relation to potential contaminant sources, thus giving rise to the potential to reduce the damaging effects of a spill.

These attributes being recognized, those skilled in the art will appreciate that the design of containment booms is difficult because of the often conflicting requirements placed on materials used. What is needed is a containment boom with durable, flexible, buoyant, heat resistant, flotation that is at once flexible and collapsible for convenient storage, transport, deployment and use, and also ruggedly constructed so as to reliably survive adverse conditions of use without loss of function. The present invention addresses these concerns.

SUMMARY OF THE INVENTION

Briefly, and in general terms, the present invention provides an improved contaminant containment boom combining collapsible and rugged construction with improved flexibility and heat resistance. The boom construction includes a flotation portion formed from a collapsible support structure which supports a heat resistant outer covering, for example of a woven refractory material, over a porous spacing layer, such as a corrugated wire mesh, in turn placed over another covering of woven refractory material. An air gap is formed between the layers of refractory material, for example by the corrugations of the mesh, giving rise to a an increased thermal gradient across the layered cover.

The boom in accordance with the invention also provides a flexible float assembly within the flotation portion movably connected to the support structure to allow limited relative movement between the float assembly and the support structure of the boom. An air gap is formed between the float assembly and the outer covering above a water level within the flotation portion of the boom by the support structure.

In a more detailed aspect, the float assembly includes non-continuous lengths of laminated closed-cell foam having transverse slots at preselected intervals along an outer edge of each laminated layer. The laminated layers are joined only in the center region of the non-continuous lengths of foam, allowing relative slip between the layers, increasing with distance from the center, facilitating bending. These laminated layers of closed cell foam are covered by a layered covering having an outer refractory layer formed from a woven ceramic fiber material and at least one layer of spacing material such as corrugated wire mesh, as well as at least one layer of liquid absorbent material which may be selected from the group including closed-cell foams, semi-closed cell foams, woven and non-woven ceramic or polymeric fiber fabrics or battings. Provision is made for water to enter the flotation portion which in turn may wick up into one or more water absorbent layers covering the flotation foam portion of the float assembly via access provided in the covering at a bottom location of the float assembly located in a bottom interior portion of the float portion of the boom. Water wicked up into an absorbent layer is allowed to escape from the float assembly as steam, thereby taking full advantage of the latent heat of vaporization which continually occurs once begun, water being supplied by wicking action, and heat is removed in this way from the float assembly and providing a cooling effect.

The provisions for escape of steam from the boom can include incorporation of porous layers in the covering of the float assembly, as well as vents placed at intervals therein, as well as vents in the outer covering of the flotation portion. Vents in the outer covering are advantageously constructed with openings formed in the outer layer of woven ceramic material offset from openings in the inner layer of woven ceramic material, with the intervening corrugated mesh material being continuous, so as to allow and steam to escape from the flotation portions without allowing radiant heat to be admitted through the vents in the outer cover. These vents also allow air to be admitted or expelled from the flotation portion as it expands or contracts as the boom is being deployed or recovered from or onto a storage reel.

In more detail, improved flexibility is imparted by providing a pivotable connection between the support structure, such as a helical coil supporting the flotation portion and the outer covering along the bottom center of the interior of the flotation portion, and connecting the float assembly to the collapsible support structure as mentioned above, in connection with providing improved flexibility to the float assembly itself. Flexibility of the float assembly is enhanced by providing transverse slots along the edges of the laminated layers of the floats and by providing for relative slip between layers of laminated float material contained in the float assembly, facilitating bending in horizontal and vertical planes. Also, flexibility is enhanced by providing a non-continuous laminated construction wherein the layers of the float assembly periodically terminate forming discrete float portions within the continuous float assembly. Also, pleats are provided at intervals in the continuous outer layer of the float assembly to further facilitate bending.

In a further more detailed aspect, stress relief joints are provided at intervals in the outer covering of the flotation portion of the boom, and as will be apparent to one skilled in the art, the boom may be provided in sections of predetermined length and the joints periodically disposed between these sections are configured to also allow relative slip between elements providing stress relief and additional flexibility. These joints, as well as the strain relief portions provided in the outer cover, also supplement the vents described above in allowing water, air, or steam to enter or escape from the interior of the flotation portion as required.

As is known in the art, the boom may be comprised of joined sections of shorter length. The joints between boom sections, while allowing relative slip as required between elements, and flexibility, are also configured to provide uniform boom function and attributes across the joint. In this regard the adjoining sections of support structure, for example helical coil members, are made to abut. Finished ends are provided for example by laying up adjoining coil sections so as to overlap for a selected distance. A small diameter coil spring is placed upon the overlapping coils and stretched to wrap the coils together to act as one along the overlapping portion forming a finished end. A wire mesh joint cover having diagonally oriented edges in relation to a longitudinal axis of the boom is provided over the coil in the area of the joint, and an outer joint covering is provided over the outer covering of the flotation section. These allow stress relief and the escape of air and steam from the boom, continuity of the boom containment function across the joint, and smooth function of the support member compression and expansion.

Other features and advantages of the invention will become apparent from the following detailed description, taken in conjunction with the accompanying drawings, which illustrate, by way of example, the features of the invention.

DESCRIPTION OF THE DRAWINGS

FIG. 1 is a elevational view of the boom of the invention being deployed;

FIG. 2 is a perspective view of a portion of the deployed boom shown partially in cut-away;

FIG. 7 is a developed plan view of an inner joint cover shown in FIG. 6;

FIG. 8 is a sectional view through a strain relief portion of the outer cover; and FIG. 9 is a developed plan view of the outer cover of the boom at a strain relief portion.

DETAILED DESCRIPTION OF THE PREFERRED EMBODIMENTS

Figures 3, 3A:
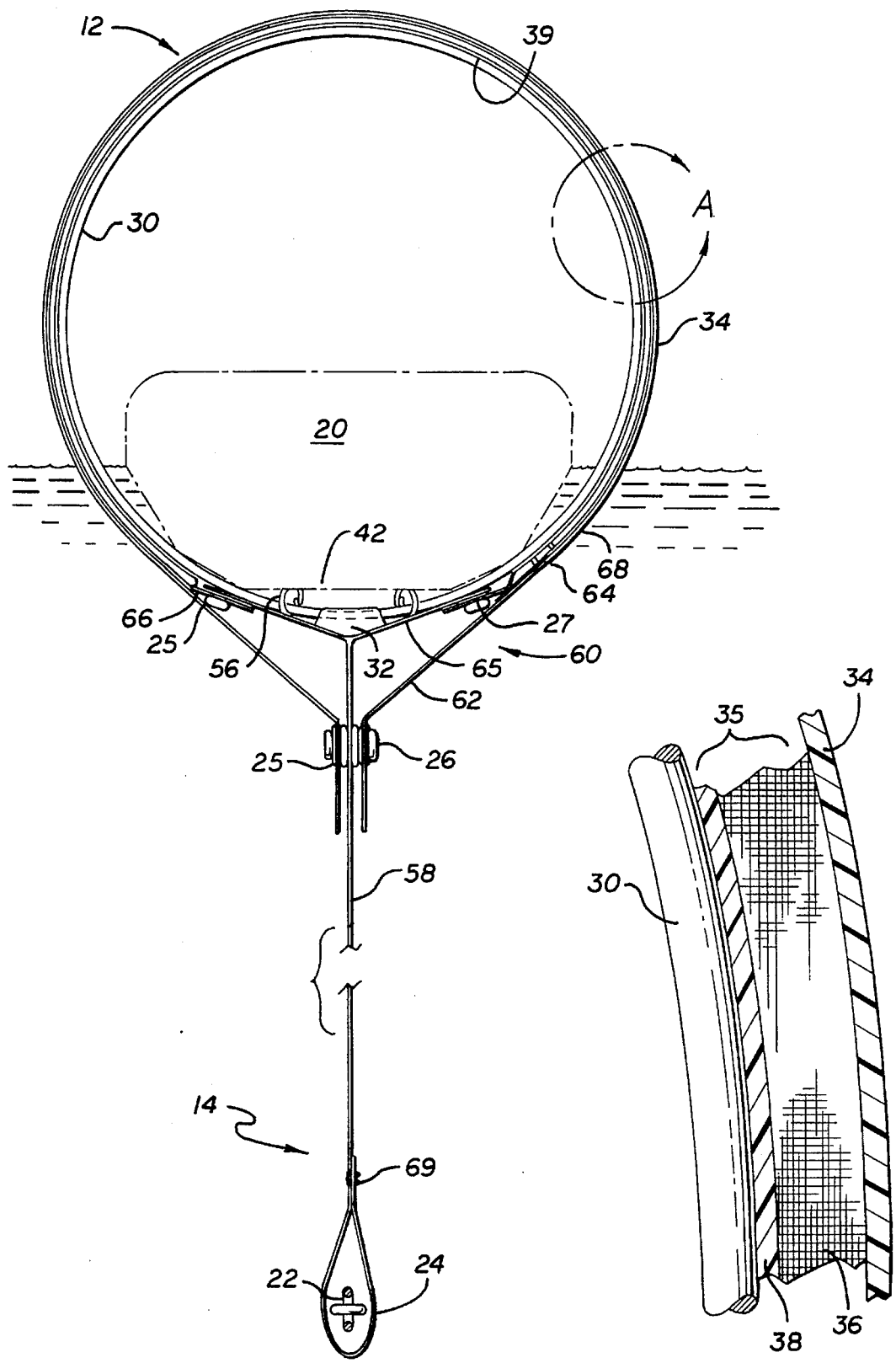
FIG. 3 is a medial elevational cross section view of the deployed boom resting on the surface of a liquid body.
FIG. 3a is a medial elevational cross section view of a portion of the boom shown in FIG. 3

As shown in FIG. 1 of the drawings, which are provided for purposes of exemplary illustration, the invention is embodied in a contamination control boom 10 having a flotation portion 12 and a weighted curtain or skirt portion 14. The boom is stored and deployed from a reel 16. The reel is preferably rotatably mounted upon a platform 18 such as a vessel, dock or trailer, and the reeled boom is easily transportable.

As will be apparent to those skilled in the art, the boom 10 is in a compressed condition when wound on the reel 16. The boom 10 returns to an expanded operating condition when it is free of the reel 16, which will be further described below. The flotation portion 12 in this example is generally circular in cross section in its fully deployed and expanded condition and provides a freeboard substantially greater than that provided by an internal foam flotation portion (not shown) alone. The weighted skirt portion 14 extends down below the flotation portion into the water when the boom is deployed to cut off the escape of floating contaminants below the underside of the float portion.

Turning now to FIG. 2, the general configuration of the boom 10 is shown, the flotation portion 12 being generally tubular and containing a float assembly 20 inside. The skirt portion 14 depends from the flotation portion and is weighted by a chain 22 enclosed in a weight casing 24 formed in the bottom of the skirt portion. Other configurations for the flotation portion than the one illustrated could be employed, for example compressible or non-compressible stand-off cover supports or frames (not shown) could connect the float assembly 20 to an insulating cover defining the flotation portion 12. The flotation portion also may have a different shape depending on the particular compressible or non-compressible support structure used, and may be closed, or vented to the water or atmosphere outside.

As will become apparent to one skilled in the art from the illustrated embodiment, and should be understood to apply to other configurations, provision of an air gap to provide a thermal boundary layer between the environment outside the floatation portion 12 of the boom 10 and the float assembly 20 inside allows the float assembly to be made of lower temperature tolerance materials, including more flexible foam materials.

Additionally, while not specifically discussed, other ways of implementing the principles of the invention will suggest themselves to those skilled in the art. For example, providing a flexible separate heat resistant outer structure which may incorporate the air-gap and other features described herein, capable of fitting over a float assembly 20 such as described herein or another configuration such as a standard circular cross section float (not shown), being releasably attached thereto when containment of burning contaminants is desired, are intended to be included within the scope of the invention.

As will be appreciated by one skilled in the art the boom 10 is compactible by the skirt portion 14 simply folding up, and the flotation portion 12 being provided with a compressible coil wire support 30 which is pivotally attached to the interior of the flotation portion at the bottom thereof by retaining straps 32 attached to the upper end of the skirt portion 14 engaging the bottom of the coils, allowing the coils to rotate as the boom is rolled onto a reel 16 for example. Additionally, the float assembly 20 is somewhat deformable, allowing it to be compressed to a certain extent in storage of the boom.

The flotation portion 12 is generally formed by covering the coil with layers 34, 36, and 38 of various materials which cooperate to form a heat resistant contaminant impervious barrier around the coils 30, thereby defining a generally tubular structure in a deployed state. An outer heat-resistant cover 34 is formed from a refractory material. A fabric of woven ceramic fibers has been found to work well for this purpose. The outer layer may be coated with a flexible protective waterproof and abrasion resistant coating, for example a silicone polymer. This coating can be applied to one or both of the inner and outer surfaces of the fabric. The coating may be sacrificed where exposed to high temperatures, but will serve to protect the outer refractory layer during handling for storage and deployment, and will still allow it to be flexible.

The outer cover 34 is underlain by an inner cover 35 defined by layers 36 and 38 around the upper portion of the flotation portion. A spacing layer 36 of a highly porous and bulky material, having a high temperature tolerance, and having minimal contact with the outer cover layer 34 and inner cover layer 38 serves to provide an air gap between the inner and outer cover layers.

As will be appreciated by those skilled in the art, a thermal boundary layer providing a relatively larger temperature gradient is provided across these cover layers due to this insulating configuration. It has been found that a continuous crimped heat resistent stainless steel open weave mesh 36 formed, for example, by crimping corrugations in a woven mesh of stainless steel wire, works well for this purpose. The spacing layer of crimped mesh is an integral part of the inner cover 35, and is securely attached thereto.

The crimped mesh layer 36 also increases the puncture and tear resistance of the flotation portion 12 of the boom 10, and enhances its flexural strength.

The inner layer 38 of the inner cover 35 is also a refractory material similar to the outer layer 34. The weave of the ceramic fiber fabric is also tight enough to preclude contaminants passing through the material. This inner layer is coated on the outside with a protective coating such as that described in connection with the outer layer. The inner surface 39 of the inner layer 38 is left uncoated and allows the coils 30 to move more freely with respect to the inner surface. This is desirable during deployment and recovery of the boom for example, as the coils may slide against the inner surface 39 with relative movement of the coils and inner surface as the coils lay over into a compressed configuration, or deploy to an expanded configuration, as the boom is reeled onto the reel 16 (not shown) or reeled off the reel, respectively. Coating the outer side provides abrasion resistance against the wire mesh 36.

The float assembly 20 positioned within the flotation portion 12 comprises a laminated construction. The outer two cover layers 40 and 42, comprised of an outer layer 40 of a refractory material such as a ceramic fiber fabric, and an underlying layer 42 of corrugated wire mesh as described above in connection with the mesh layer 36 in the inner cover 35 of the flotation portion, are continuous between joints (not shown) in the boom 10 described below; whereas structures of laminated sub-layers 44, 46, 48, 50, 51, as well as a laminated float 52 (all not shown) are not continuous but rather are broken into relatively shorter sections defining separate floats 41 to provide increased overall flexibility. Regularly spaced slots 54 (not shown) are provided in the outer periphery of the interior layers (not shown) of the laminated float 52 which facilitate increased flexibility in a sideways direction to complement increased flexibility in a vertical direction facilitated by the non-continuous structure of the interior layers and the laminated float as will be described.

The float assembly 20 is movably attached to the coils 30 by float assembly attachment rings 56 formed from stainless steel wire. The rings engage the wire mesh layer 42 of the float assembly at a bottom portion where the mesh layer overlaps in providing closure of the outer cover layers 40 and 42 around the inner layers of the float assembly, and the stainless steel mesh is doubled strength. This attachment allows limited relative movement between the float assembly and the coils and provides secure attachment at a double strength portion of the mesh layer.

Further illustrated aspects of the boom 10 construction include attachment of the skirt portion 14 to the flotation portion 12. As shown in FIG. 3, a curtain portion 58 of the skirt portion is attached to the outer float cover 34 of the flotation portion by releasable twist-lock fasteners, allowing the outer float cover to be independently removed. This is advantageous as the outer float cover is most susceptible to damage during training, containment and burning operations. As will be apparent to one skilled in the art, a lower edge portion 60 of the outer float cover is underwater during operation of the boom, and consequently a non-refractory leader portion 62 of a different material can be employed in this area. The leader portion is sewn to the refractory portion of the outer cover 34 with thread 64 formed from stainless steel or of polymer fibers such as polyester.

Providing a leader portion 62 of different materials is advantageous in that it can be chosen so as to have good strength and flexibility properties for installing fasteners 26. A polyurethane coated polyester fabric has been found to work well. This increases the durability of the boom 10 in use, and makes installation of eyelet portions 25 of the fasteners for example easier. The eyelets mate with the twist-lock fasteners 26 installed in the curtain 58 of the skirt 14, securing the cover to the skirt.

The skirt portion 14 is attached to the coils 30 by coil retaining straps 32 as before described. These straps are formed from polyurethane coated polyester fabric and are fastened to the skirt portion, which is formed from the same material. Additionally, the skirt portion is provided at an upper end of the curtain 58 with a Y-shaped configuration which may be formed by securing a separate piece 65 of the same fabric material as used to form the curtain to the upper end of the curtain. Each upper branch of the Y-section of the skirt forms a fabric connection flange for mounting the fasteners 27 for connection to the inner cover layers 36 and 38 to complete the bottom portion of the inner cover 35 of the flotation portion 12 around the coils.

An inner cover leader 66 of flexible fabric material similar to the leader portion 62 of the outer cover 34 can be provided, again to provide a better material in which to install eyelets for fasteners 27. The leader is shown sewn by stitching 68 through both the inner cover 38 and the corrugated mesh layer 36. The stitching is again of high temperature stainless steel or polymer fiber thread.

This configuration provides for separate and independent removal of the inner cover 35 by disconnection of twist-lock fasteners 27, similar to that capability provided for first removing the outer cover 34 by disconnection of twist-lock fasteners 26.

The curtain 58 of the skirt portion 14 is folded back at a bottom end and seamed to form a casing 24 for containing the weight 22. The weight can be formed conventionally for example by a galvanized high strength steel chain continuous through the length of the boom 10.

Figure 4:
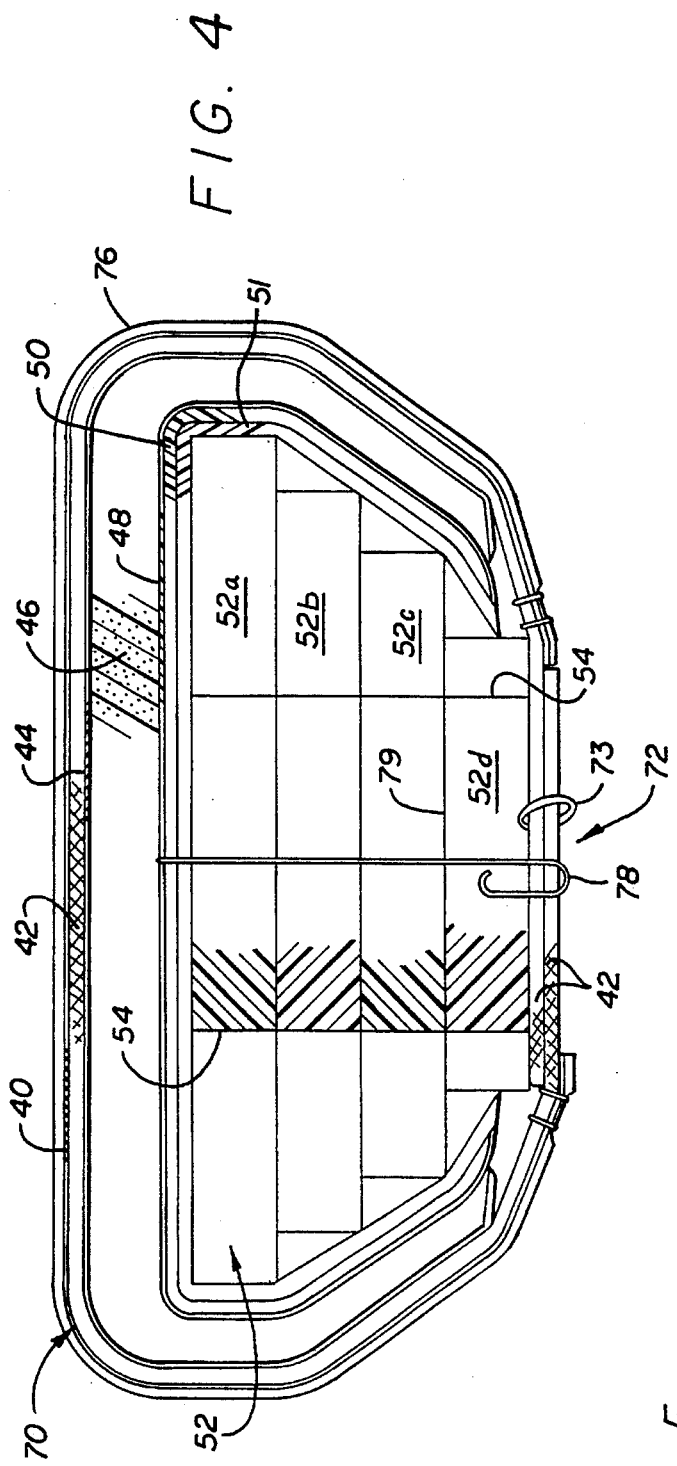
FIG. 4 is a detailed medial elevational cross section view of the float assembly shown in FIG. 3.

The float assembly 20 is shown in FIG. 4, illustrating features of the laminated construction mentioned above. An outer cover 70 is formed from the outer layers 40 and 42 and is continuous throughout the length of the boom (not shown) except at joints (not shown) in the boom. Outer float cover 40 is formed from a treated, continuous, flexible, woven ceramic fiber fabric having refractory properties, for example a silicious mineral compound coated fiberglass fabric. This float cover layer reduces heat transfer into the float assembly.

When the boom is initially exposed to a burning contaminant, the float cover 40 is predominantly dry. During an initial time period wherein it is dry, the treated glass fabric protects inner float sub-layers primarily by utilizing its thermal protection properties. After the boom has been deployed on a water surface and exposed to turbulence and a burning fluid for an extended period of time water migrates into the boom through various openings (not shown) as will be discussed below and the float cover fabric becomes saturated with water due to its wicking properties. This gives rise to an insulation effect due to heat being removed from the outer cover by means of latent heat of vaporization of steam which is formed from water wicked into the cover and thereafter escapes from the boom through various vent openings described below.

As can be seen, the outer fabric cover layer 40 covers all the outside surface but a porous bottommost part 72 of the float assembly 20. The fabric cover layer 40 extends well below the surface of the water inside the boom which will substantially equalize with respect to the water surface outside of the boom facilitating the wicking action described above.

The crimped corrugated wire mesh layer 42 forms an inner layer of the float cover 70 and extends completely around the float assembly 20 and overlaps in the bottommost portion 72 facilitating closure by crimping a stainless steel clamp 73 around and though the two overlapping layers of wire mesh 42 in this area. This construction is advantageous as it keeps the sub-layers within the mesh layer together during assembly of the float assembly.

Figure 5:
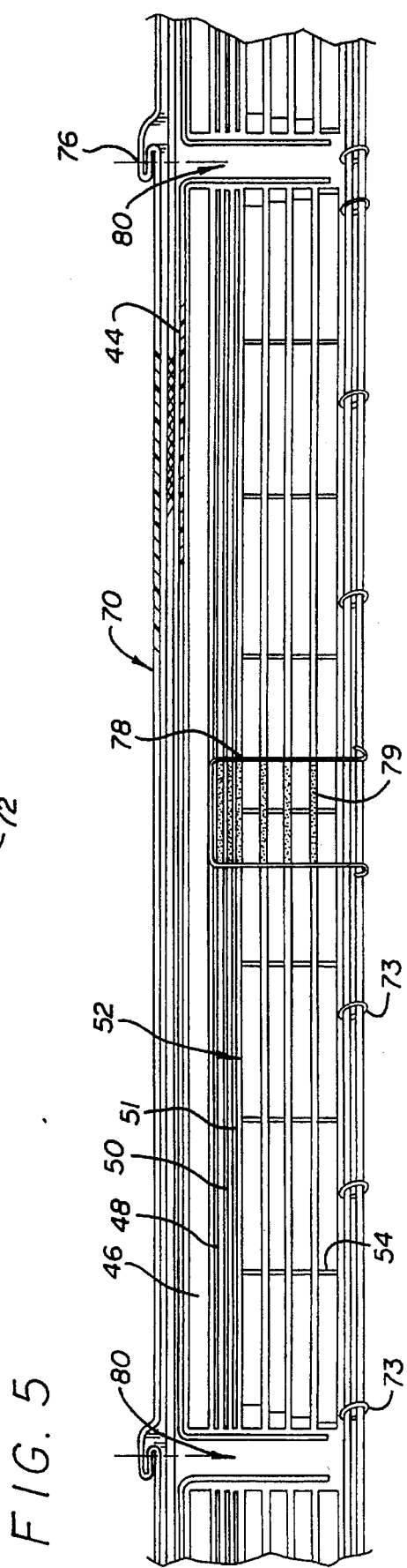
FIG. 5 is a fragmentary longitudinal elevational cross sectional view of a portion of the float assembly shown in FIG. 4.

The outer fabric cover layer 40 is sewn to the underlying mesh layer 42 by a durable thread, such as stainless steel or polyester fiber thread, to bond the two layers, thereby forming an integral layered construction of the float cover 70 which is flexible and puncture resistant. Increased flexibility in the float cover 70 is provide by providing pleats 76 in the outer fabric layer 40 of the float cover, as also shown in FIG. 5. Returning to FIG. 4, the weave of the outer fabric cover layer is tight and precludes any significant amount of contaminants that may enter the float 10 from reaching interior sub-layers of the float assembly.

The mesh layer 42 of the float cover 70 is formed from a continuous, corrugated, crimped, stainless steel wire, open weave mesh, similar to that described above in connection with the spacing layer 36 of crimped wire mesh formed in an outer layer of the inner cover 35 of the flotation portion 12. The mesh layer of the float cover provides a thermal boundary layer between the fabric cover 40 and the sub-layers below similar to that described above in connection with the outer spacing layer 36 of the inner cover 35 as it provides an air gap between the outer fabric cover 42 and enclosed sub layers except for intermittent contact of the steel wire mesh. The mesh layer also comprises a flexible continuous structural component of the float cover which in combination with the outer fabric envelopes and constrains the multi-layered and segmented float assembly portions mentioned above formed by the non-continuous laminated sub-layers forming individual laminated floats as will be discussed below.

The mesh layer 42 of the float cover 70 also comprises a flexible structural member which may be fastened to by the steel rings 56 movably attaching the float assembly to the coil 30.

The float assembly further contains sub-layers 44, 46, 48, 50, 51, and laminated float 52. These components are not continuous over the length of the boom as mentioned, but are segmented into individual floats 41 to provide increased flexibility. Various layers 48, 50, 51 and 52 of the segmented individual floats are attached from top to bottom by a large staple 78 formed from stainless steel and by a small line of glue 79 applied between each of the layers in the center region thereof. After the inner sub-layers comprising the floats are enveloped by the float cover 70 the bottommost portion of the staple of each float is bent around the wire mesh layer 42 at the bottommost portion of the assembled float assembly. This construction further ties the float assembly together, yet allows flexibility.

An outer water-wicking layer 44 of the float sub-assembly 41 is formed from a treated non-woven ceramic cloth having desirable insulating and water absorbing and wicking properties. A high-temperature non-woven fiberglass cloth coated with a silica gel or other silicious mineral compound having hydrophilic properties may be used for example.

Like the outer fabric layer 40 of the float assembly 20, this material functions differently to provide an insulating effect depending on the conditions to which it is exposed at any given time. When the boom is initially deployed and the interior of the boom 10 is predominantly dry thermal protection is provided by the insulating effect of the multiple thermal boundary layers inherent in the unwoven or batted disposition of the glass fibers comprising the layer.

When the interior portion of the boom 10 becomes wetted, this wicking layer 44 functions to draw water from the bottom area 72 of the float assembly 20 admitted by the porous mesh layer 42 in that area, and wick it up and around the top of the layer, completely saturating the layer with water. This water is converted to steam, and the fabric will thereafter continually draw water up over the inner float sub-layers for conversion to steam. This process enhances the insulation capacity of the layer as it maintains a temperature of the boiling point of water, excess steam being able to migrate into porous sub-layers, and out through the float cover 70 to be vented from the boom 10 dissipating heat thereby.

A porous foam layer 46 is provided beneath the wicking layer 44. This layer is composed of an semi-closed cell polymeric foam capable of resisting relatively high temperatures, for example such a foam formed from polyamide resin. This layer provides thermal insulation and reserve buoyancy in the float assembly 20. After the boom 10 has been exposed to elevated temperatures inherent in a fire for a short period, usually about twenty minutes, steady state conditions are attained within the flotation portion 12 of the boom. Steam generated within the wicking cloth layer 44 permeates down into the porous foam forming a thermal boundary layer of approximately 213 degrees fahrenheit.

Another layer 48 of mineral coated non-woven fiberglass cloth is provided beneath the porous foam layer 46. This second wicking layer 48 functions in substantially the same manner as the wicking layer 44 discussed above, only from below the porous layer.

Below this second wicking layer 46 two separate layers 50 and 51 of high temperature resisting closed cell foam are provided. A closed cell foam formed from polypropylene resin may be used for example. These layers provide further thermal barrier function and reserve buoyancy in the float assembly.

Lastly, a laminated float 52 is provided within the above described layers. The layers cooperating as described to thermally insulate this float from the high temperatures to which the boom 10 is intended to be exposed. The provision of layers 52a, 52b, 52c, 52d allows for relative movement therebetween, resulting in improved flexibility. As will be apparent to one skilled in the art a large number of layers is preferred, and the layers shown could be further multiplied to eight or sixteen for example by decreasing the thickness of each layer. The laminated float is formed from a closed cell polymeric foam, for example a closed cell foam formed from polyethylene. Such a material is very buoyant and also flexible and low in cost of manufacture. The layered insulating configuration of the float assembly 20 allows this relatively low temperature resistant material to be employed.

Also the float assembly 20 is given a shape which conforms to the coil 30 to which it is attached by staggering the widths of the layers 52a, 52b, 52c, and 52c, to form a roughly trapezoidal laminated float 52 section. Taking FIG. 4 in conjunction with FIG. 5, it will be appreciated that the outer edges are provided with slots 54 which allow increased flexibility of the float 52 in the horizontal direction as will be understood by one skilled in the art.

As can best be appreciated with reference to FIG. 5, the laminated floats 52 are axially aligned within the continuous float cover 70 having a pleat 76 spaced at periodic intervals, such as approximately four foot intervals, in the outer fabric layer 40. The outer wicking layer 44 is folded over at an edge portion 80 at each end of the float to encapsulate the sub-layers 46, 48, 50, 51, and the laminated float 52. This provides an easily handled sub-assembly in manufacturing the boom 10, as well as giving the increased flexibility properties discussed in connection with the float assembly. Moreover, it will be appreciated that in a similar manner the outer cover 70 is folded over and enclosed at joints (not shown) in the boom as the float assembly is conveniently non-continuous through such joints, thereby allowing ready separation.

Figure 6:
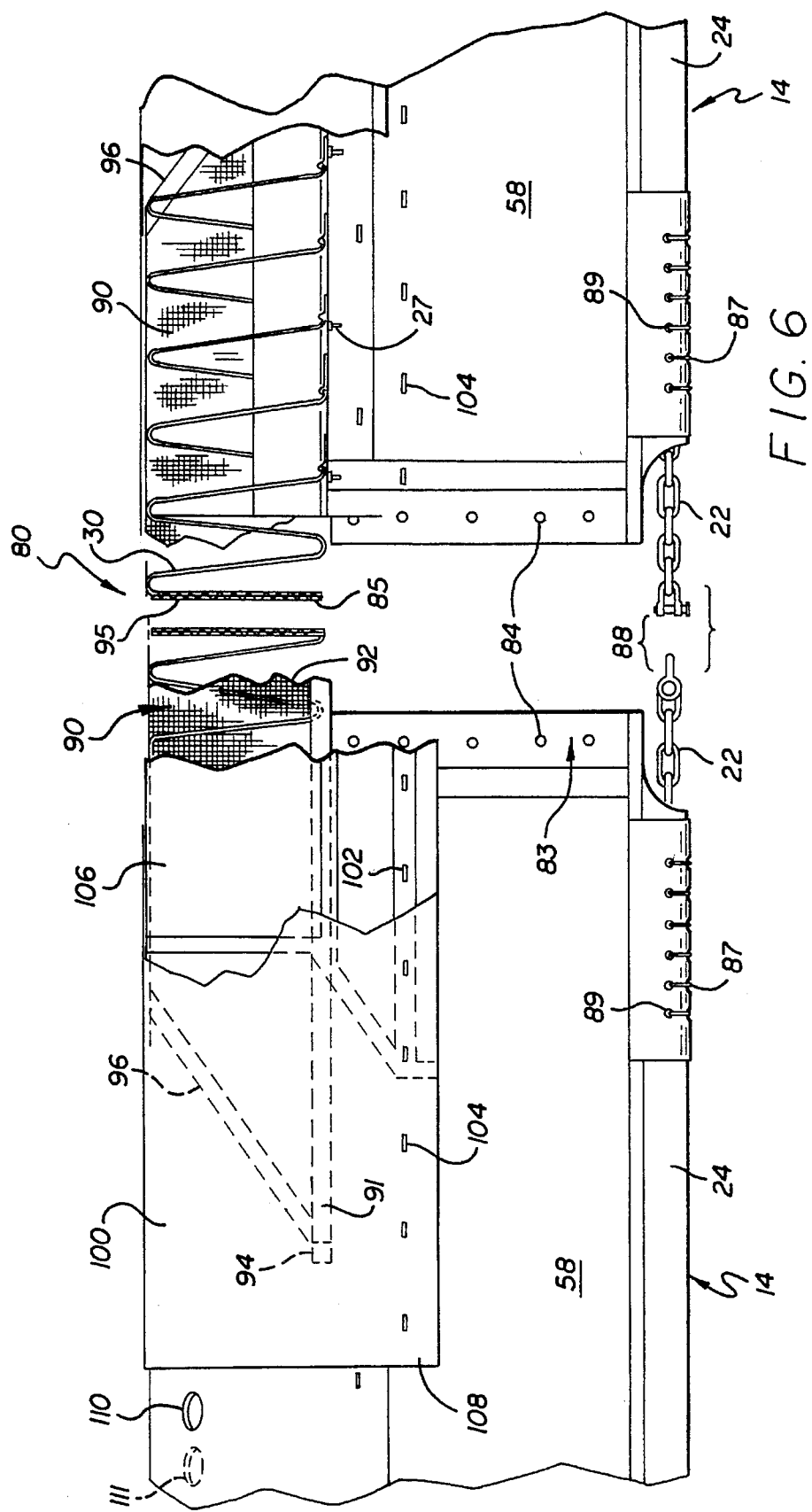
FIG. 6 is an elevational view, partially in cut-away of a joint portion of the boom of the invention.

FIG. 6 illustrates the configuration of a joint 80 between sections of the boom 10. Such joints facilitate manufacture of the boom and also function to provide venting in the covers 34, 35 over the coil 30 as hot gases escape from within the boom. Also as will be apparent to those skilled in the art the joints provide a capability to make discrete boom sections releasable, for example to remove a section to make repairs in the field.

The joint 80 is effected by terminating the coil 30 by lashing an overlapping end portion 85 together with and uncoiled stainless steel spring 95 of suitable diameter to effect a good connection and by providing releasable fastener portions 83 incorporating grommets 84 compatible with twist-lock fasteners, and reinforcing materials as are well known in the art in the curtain 58 of the skirt portion 14 at the joint. The weight chain 22 is provided with a releasable connector 88 at the joint and is lashed to the casing 24 of the skirt portion by polyester fiber rope 87 fed through grommets 89 provided in the casing and the links of the chain 22.

With reference to both FIGS. 6 and 7 a wire mesh coil joint cover 90 is provided, enclosing the coil over the joint portion 80 where the covers will not be continuous. This cover can be formed from the same type of stainless steel mesh employed elsewhere in the boom 10 construction, but is preferably flat. The edges aligning with the axis of the boom are provided with a reinforced leader 91 construction where the mesh 92 is sandwiched between layers of polymer coated fabric 93 such as polyurethane coated polyester fiber fabric by sewing with stainless steel or high temperature resistant polymer thread (not shown) and provided with grommets 94 adapted to interfit with twist lock fasteners 27 connecting the y-portion of the skirt portion 14 to the inner cover 35.

The edges 96 extending diagonally are protected by a strip of coated fabric material forming an edge cover 96 by being wrapped around the edge and sewn with stainless steel stitching (not shown) in a double row. The cover may be formed for example by a coated ceramic fiber material such as is employed in the inner cover 35 of the boom.

Referring to FIG. 6 the joint 80 is further protected by an outer joint cover 100 formed from a polymer coated fabric material. This material may be for example the coated polyester material described above in connection with the inner cover leader portion 62. It will be understood by one skilled in the art that the portion of this outer cover exposed to burning contaminants may be sacrificed. The outer cover is provided with grommets 102 for releasably affixing the outer cover to the boom 10 by means of the twist-lock fasteners 104 provided in a row in the curtain 58 of the skirt 14. As will be apparent other types of releasable fasteners may be used instead of those described herein.

The outer joint cover 100 protects the inner float chamber of the boom 10 should it become exposed through the joint 80 between the section covers.

The outer joint cover 100 also contains a central region 106 formed from a layer of coated refractory material such as coated silica fiber fabric, as described above in connection with the outer cover 34, positioned on the inner surface of the joint cover 100 over the joint 80. The portions of the cover assembly 100 above the waterline, except for the central region 106, will be expected to be sacrificed when exposed to burning contaminants.

The joint portion 80 described also allows steam to escape from within the flotation portion 12 of the boom 10 through the non-continuous outer cover 34 at the joint 80. Additionally, vent holes 110 and 111 may be periodically provided in the inner and outer heat resistant coil cover layers 34 and 38, respectively, along the length of the boom to allow steam to escape. Such vents are positioned near the top of the boom and are offset as to the inner and outer cover layers so that radiant heat energy is prevented from directly entering the boom. As will be appreciated by one skilled in the art steam travels in the air gap formed by the spacing layer 36 of wire mesh between the inner and outer vent holes 111 and 110 respectively.

Referring to FIGS. 8 and 9 strain relief portions 112 are provided periodically along the length of the boom 10 comprising a non-continuous portion of the outer cover 34 underlain by a strain relief protective cover portion 114 which is stitched along edge portions 116 to the inside surface of the outer cover 34, but left free along edge portions 118. As will be appreciated by those skilled in the art this feature provides for strain relief of the outer cover in bending of the boom 10.

Edge portions of the strain relief portion 112 are wrapped in a reinforcing strip 122 of coated refractory cloth such as described for use in the inner coil cover layer 38, and sewn in multiple seams with stainless steel thread 124.

A removable tow adapter (not shown) may be provided at the end of the boom for closing off the opening at the end of the flotation portion to prevent excessive water ingress into the boom during towing and for providing selective attachment of a tow line used to deploy and position the boom in a body of water. The two adapter advantageously is formed for the most part of a non-refractory material, and has a sack-like configuration with an open end fitted onto the end of the boom and a closed end attached to the two line. The open end is fitted onto the boom in such a way that the adapter material either overlaps or underlaps the coil covers, depending upon the direction of tow, so as to prevent the ingress of excessive amounts of water into the boom through the region of overlap or underlap while the boom is being towed. The chain in the skirt portions of the boom is removeably attached to the closed end of the adapter to keep the chain in tension during towing.

An opening with a wire mesh is provided in an upper surface of the adapter adjacent the end of the boom to allow heated vapors to escape from the interior of the boom. A float is positioned inside the adapter between the closed end and the mesh covered opening. The surface of the float closest to the opening is covered with refractory material to protect the float from the heat of the escaping vapors.

From the foregoing it will be appreciated that the high temperature resistant boom 10 of the invention provides advantages in flexibility, continuity of boom function in containing contaminants along its entire length, lightness in weight, fire resistance, ease of storage, deployment and repair over prior art booms of this general type, without sacrificing durability and manufacturability.

While a particular form of the invention has been described, it will be apparent that various modifications can be made without departing from the spirit and scope of the invention.

What is claimed is:

1. A high temperature resistant contaminant containment boom of the type adapted to contain burning contaminants floating on a liquid surface, comprising:
   a flotation portion comprising
      a coil support member,
      an outer coil covering layer formed from a refractory material,
      an inner coil cover layer formed from refractory material,
      a spacing material supported air gap layer between said inner and outer coil covering layers defining a thermal insulating layer,
      a flexible float assembly having refractory properties at least in part comprising means for wicking water to the float assembly and dispersing heat therefrom in the form of latent heat of vaporization of steam which leaves the flotation portion; and
   a ballasted skirt portion depending from the coil support member and incorporating fasteners for attachment of the coil cover layers.

2. A heat-resistant contaminant containment boom, adapted to contain a contaminant floating adjacent a liquid surface to a selected portion of the liquid surface, having a flotation portion adapted to maintain the boom at the surface of the liquid and to maintain the contaminant on one side thereof, and a weighted skirt portion extending a selected distance downward from the flotation portion adapted to further contain the contaminant by preventing it from migrating underneath the flotation portion of the boom, comprising:

a float comprising low-density material connected to the weighted skirt portion below the liquid surface and providing a buoyant force acting on the boom;

a layer of liquid absorbent material disposed about the float above the liquid surface and extending below the liquid surface, said absorbent material being adapted to wick liquid up and around the float and wherein the liquid may vaporize upon absorbing heat, the boom further comprising vents to allow for the escape of expanded gases and said liquid vapor;

a heat-resistant cover enclosing the float above the liquid surface and separating the float from the contaminant above the liquid surface, said cover further comprising:
an outer cover of flexible heat-resistant material,
an inner cover of flexible heat-resistant material,
a spacing layer defining an air gap, disposed between said inner and outer covers, maintained by a flexible support structure adapted to hold said inner and outer covers apart and to have minimal surface contact therewith to minimize heat transfer through the cover;

whereby the float is protected from high temperatures above the liquid surface adjacent the boom.

3. The heat-resistant contaminant containment boom of claim 2, wherein the spacing layer is formed of a crimped wire mesh.

4. A heat-resistant contaminant containment boom, adapted to be deployed from a compressed state to an expanded deployed state to contain a contaminant floating adjacent a liquid surface to a selected portion of the liquid surface, said boom having a flotation portion adapted to maintain the boom at the surface of the liquid and to contain the contaminant on one side thereof, and a weighted skirt portion extending a selected distance downward from the flotation portion adapted to further contain the contaminant in the selected portion of the liquid surface by preventing it from migrating underneath the flotation portion of the boom, comprising:

a compressible support configured to expand upon deployment of the boom, and maintain in an expanded state a flotation portion of said boom;

a heat-resistant cover enclosing the support and defining an interior volume therein including an air gap, the cover further comprising:
an outer cover of flexible heat-resistant material,
a spacing layer of flexible porous material having surface contacts with the outer cover at discrete contact points of minimal surface area, so as to provide support for said outer cover and minimize heat transfer through the contact points,
an inner cover of flexible heat-resistant material having minimal surface contact with the spacing layer at contact points distributed so as to provide support but minimize heat transfer therethrough, the inner and outer covers being spaced apart by the spacing layer, thereby providing a thermal insulating air gap between the inner and outer covers;

a float positioned within said flotation portion and attached thereto, said float comprising multiple discrete float sections disposed along the length of the boom to allow greater flexibility, and a cover which encloses a plurality of said discrete floating sections along the length of the boom, said float extending below the liquid surface so as to provide a buoyant force to the flotation portion when liquid enters the interior volume of the flotation portion, an air gap being provided between the float and the heat-resistant cover of the flotation portion above the liquid surface; whereby the float is protected from high temperatures above the liquid surface adjacent the boom.

5. The heat-resistant contaminant containment boom of claim 4, wherein the spacing layer is formed of a crimped wire mesh.

6. The heat-resistant contaminant containment boom of claim 4, wherein the support is a helical coil attached to the skirt portion by pivotable connections at a bottom portion of the flotation portion.

7. The heat-resistant contaminant containment boom of claim 6, wherein the helical coil is attached to the bottom portion of the flotation portion by straps formed into loops that enclose the coils at a bottom portion thereof.

8. The heat-resistant contaminant containment boom of claim 4, wherein the cover of the float further comprises pleats therein spaced at intervals along the float, allowing greater relative movement between the enclosed float sections.

9. The heat-resistant contaminant containment boom of claim 4, said float further defining a multiplicity of transverse slots formed therein adjacent the outer periphery of the float, the slots allowing for expansion and contraction of the outer periphery of the float along the length of the boom to allow greater boom flexibility.

10. The heat resistant contaminant containment boom of claim 9, wherein said float includes a plurality of layers of low density heat-resistant materials arranged vertically allowing for relative movement therebetween in a longitudinal direction.

11. A heat-resistant contaminant containment boom comprising:

a flotation portion having a heat resistant cover with openings therein through which fluids may pass;

a weighted skirt portion extending downward from said flotation portion;

a float formed of a plurality of layers, including at least one interior layer and a cover layer; at least one of said interior layers being formed of a water absorbent material; and further comprising a layer permeable by steam; whereby water is wicked into the float via the absorbent layer, thereafter absorbing heat and vaporizing, the steam thus formed escaping from the float via the steam permeable layer and from the boom through said openings, carrying away from the boom latent heat and thereby providing a cooling effect.

12. The heat-resistant contaminant containment boom of claim 11, further comprising a core within the float and wherein the steam-permeable layer is disposed between the water absorbent layer and the core adjacent the absorbent layer, water being wicked into the absorbent layer, being converted to steam, and the steam permeating the steam permeable layer for escape from the float.

13. The heat resistant contaminant containment boom of claim 11, wherein said heat-resistant cover further comprises an outer cover layer of heat-resistant material, an inner cover layer, and a spacing layer therebetween defining an air gap, maintained by a support structure adapted to hold said inner and outer cover layers apart and have minimal surface contact therewith to minimize heat transfer through said heat-resistant cover; further comprising offset openings in the inner and outer cover layers of said heat-resistant cover defining a pathway therethrough, whereby steam and other gases may pass through said heat-resistant cover, and radiant heat cannot directly pass through.

14. A heat-resistant contaminant containment boom, adapted to be deployed from a compressed state to an expanded deployed state to contain a contaminant floating adjacent a water surface to a selected portion of the water surface, said boom having a flotation portion adapted to maintain the boom at the surface of the water and to contain the contaminant on one side thereof, and a weighted skirt portion extending a selected distance downward from the flotation portion to further contain a contaminant by preventing it from migrating underneath the flotation portion of the boom, comprising:

a compressible support configured to expand and provide a flotation portion of said boom having an increased volume in a deployed state and to provide for an air gap therein;

a heat-resistant cover enclosing the support and defining the flotation portion and a volume therein including an air gap, said cover having vents therein;

a float assembly comprising water wicking material, flotation material, and a steam permeable heat-resistant cover, disposed within said flotation portion and attached thereto so as to provide a buoyant force to the flotation portion when water enters the interior volume of the flotation portion, said air gap disposed between the float assembly and the heat-resistant cover of the flotation portion; whereby water is wicked into said float assembly, absorbs heat, and is converted to steam to carry away such heat as latent heat of vaporization, the steam permeating the float assembly cover and escaping from the float assembly, thereafter exiting the flotation portion of the boom through said vents, providing a cooling effect to the boom.

15. The heat-resistant contaminant containment boom of claim 14, further comprising boom sections, and a joint in the boom connecting two boom sections together, said joint comprising an inner joint cover disposed between the flotation portion cover and the support and continuous across the section joint, and an outer joint cover disposed over the flotation portion cover continuous across the section joint, said joint covers being attached to the flotation portion cover so as to allow relative movement therebetween and to allow limited flexure of the joint between boom sections.

16. The heat-resistant contaminant containment boom of claim 15, wherein the inner joint cover comprises a sheet of material having helical ends when the inner joint cover is in place across said joint, the configuration of the helical ends allowing relative motion between the inner joint cover and the support member without snagging.

17. The heat-resistant contaminant containment boom of claim 16, wherein said support comprises coiled helical flexible wire sections having adjacent end portions in abutment at said joint, the coil sections being wrapped together at the end portion to form a smooth connection.

18. The heat-resistant contaminant containment boom of claim 14, further comprising a stress relief portion in the cover of the flotation portion comprising a medially oriented discontinuity in the cover extending at least one-half the circumferential distance around said flotation portion, the edges of said discontinuity defining a slit in the cover of the flotation portion in a relaxed state, and further comprising a layer of heat-resistant material underneath the cover of the flotation portion in the proximity of the stress relief portion of the cover of the flotation portion extending beyond the stress relief portion so as to protect the interior of the flotation portion when said slit is opened by stress in the flotation portion cover.

19. The heat-resistant contaminant containment boom of claim 14, wherein the heat-resistant cover further comprises:
an outer cover of flexible heat-resistant material;
an inner cover of flexible heat-resistant material;

a highly permeable spacing layer disposed between the inner and outer covers adapted to hold the inner and outer covers apart and to form an air gap therebetween, said spacing layer having spacing components adapted to provide minimal contact with said inner and outer covers so as to minimize heat transfer across said air gap maintained by said spacing layer.

20. The heat-resistant contaminant containment boom of claim 19, further comprising a vent through the flotation portion heat-resistant cover comprising an opening in the outer cover layer, and an opening in the inner cover layer offset from the opening in the outer layer, the inside the flotation portion being in communication with the environment outside the flotation portion through the heat-resistant cover of the boom through the spacing layer between the inner and outer cover layers thereof.

21. The heat-resistant contaminant containment boom of claim 14, wherein the flotation portion cover is removable.

22. The heat-resistant contaminant containment boom of claim 14, wherein the float comprises low density material disposed in layers, the float being divided into discrete float sections arranged end-to-end longitudinally in the flotation portion of the boom, the layers of each float section being connected near the center thereof, but the ends remaining free to provide relative slip therebetween.

23. A heat-resistant contaminant containment boom adapted to contain a contaminant floating adjacent a liquid surface to a selected portion of the liquid surface, having a float assembly adapted to maintain the boom at the surface of the liquid, said float assembly having top, bottom, and side portions, and the boom also have a flotation portion enclosing the float assembly, and a weighted skirt portion extending a selected distance downward from the flotation portion adapted to further contain a contaminant by preventing it from migrating underneath the flotation portion of the boom, comprising:

a heat-resistant cover removably disposed about said flotation portion, having vent openings therethrough, and defining a volume therein including an air gap, the cover further comprising:
an outer cover of flexible heat-resistant material;
an inner cover of flexible heat-resistant material;
a spacing layer disposed between said inner and outer covers, defined by flexible spacing structure which holds the inner and outer covers apart to maintain an air gap therebetween, said spacing structure having minimal surface contact with said inner and outer covers at discrete contact points over the surface of the inner and outer covers, providing support yet minimizing heat transfer through said heat-resistant cover;

a flexible compressible helical support configured to support the cover but minimize heat transfer to the float assembly contained within the flotation portion, the helical support contacting said float assembly at a bottom portion thereof below said liquid surface, and otherwise providing an air gap between the cover and the top and side portions of the float assembly;

a multiplicity of floats formed of a low density material, arranged end-to-end within the float assembly;

a float cover enclosing the floats of the float assembly formed of heat-resistant material;

a layer of liquid absorbent material disposed between said floats and said float cover having a portion thereof below said liquid surface and available to said liquid body so as to be able to absorb liquid therefrom into said float assembly, absorb heat from the float assembly and vaporize;

a layer of permeable material disposed between said floats and said float cover adjacent said liquid absorbent layer to provide a conduit for the escape of vapor from the float assembly; whereby the floats are protected from heat by an insulating effect provided by the air gap between the inner and outer covers of the flotation portion cover, the air gap between the flotation portion cover and the float assembly, and the cooling effect of heat being removed from the float assembly in latent heat of the liquid vapor escaping therefrom, said vapor exiting the boom via said vents through the flotation portion cover.

* * * * *